United States Patent
Nakade

(10) Patent No.: US 9,956,877 B2
(45) Date of Patent: May 1, 2018

(54) VEHICLE SPEED LIMITING DEVICE

(71) Applicant: TOYOTA JIDOSHA KABUSHIKI KAISHA, Toyota-shi, Aichi (JP)

(72) Inventor: Yusuke Nakade, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/174,335

(22) Filed: Jun. 6, 2016

(65) Prior Publication Data

US 2016/0355183 A1    Dec. 8, 2016

(30) Foreign Application Priority Data

Jun. 4, 2015    (JP) .................................. 2015-113789

(51) Int. Cl.
*B60K 35/00* (2006.01)
*B60K 31/04* (2006.01)

(52) U.S. Cl.
CPC ............ *B60K 35/00* (2013.01); *B60K 31/047* (2013.01); *B60K 2310/20* (2013.01); *B60K 2310/244* (2013.01)

(58) Field of Classification Search
None
See application file for complete search history.

(56) References Cited

U.S. PATENT DOCUMENTS

| | | | |
|---|---|---|---|
| 2008/0270001 A1* | 10/2008 | Seto ........................ | B60K 31/00 701/93 |
| 2010/0217494 A1* | 8/2010 | Heft ......................... | B60T 7/22 701/70 |
| 2012/0253628 A1 | 10/2012 | Maruyama | |

FOREIGN PATENT DOCUMENTS

| | | |
|---|---|---|
| JP | 2008-265706 A | 11/2008 |
| JP | 2012-206594 A | 10/2012 |
| JP | 2012-240605 A | 12/2012 |
| JP | 2013-203379 A | 10/2013 |

* cited by examiner

*Primary Examiner* — Rodney A Butler
*Assistant Examiner* — Tamara L Weber
(74) *Attorney, Agent, or Firm* — Oliff PLC

(57) ABSTRACT

An upper-limit vehicle speed should be prevented from being set to speed different from an intention of a driver. When it is detected that a speed limit is changed, an upper-limit vehicle speed setting ECU temporarily switches a control mode from a normal mode to an inquiry mode. An ASL operation unit serves a function for a change operation of upper-limit vehicle speed in the normal mode, and serves a function for a reply operation about whether the speed limit is accepted in the inquiry mode. When the ASL operation unit is operated in the normal mode, the upper-limit vehicle speed setting ECU does not switch the control mode to the inquiry mode, even if a change of a speed limit is detected, until a certain period of time (a certain period during which a mode switching prohibition period is set) has passed since the operation.

12 Claims, 9 Drawing Sheets

VEHICLE SPEED LIMITING DEVICE

TECHNICAL FIELD

The present invention relates to a vehicle speed limiting device which acquires a speed limit of a vehicle in a run way, sets up upper-limit vehicle speed that is an upper limit of vehicle speed based on the acquired speed limit, and controls a driving force so that vehicle speed does not exceed the upper-limit vehicle speed.

BACKGROUND ART

Conventionally, a vehicle speed limiting device called a variable speed limiter (Adjustable Speed Limiter: ASL) has been known. Driving force of a drive source for running is controlled by this vehicle speed limiting device so that vehicle speed does not exceed upper-limit vehicle speed which a driver sets. Moreover, as proposed in the Patent Document 1 (PTL1), a vehicle speed limiting device which automatically recognizes a speed limit of a vehicle in a run way by photographing a road sign and changes upper-limit vehicle speed based on this speed limit has been also known. This device disclosed in the Patent Document 1 comprises a switch for increasing or decreasing upper-limit vehicle speed, and is configured to be able to change (adjust) the upper-limit vehicle speed by a driver operating this switch.

In the vehicle speed limiting device disclosed in the Patent Document 1, a display leads a driver to change upper-limit vehicle speed (shows a driver change proposal) when a speed limit in a run way is changed. The driver sees this change proposal, and replies whether a new speed limit may be reflected in upper-limit vehicle speed by switch operation (reply operation). This vehicle speed limiting device is configured to perform a change operation of upper-limit vehicle speed and the reply operation about whether the new speed limit may be reflected in the upper-limit vehicle speed using a common switch. That is, the switch is configured to have its function switched from that for a change operation of upper-limit vehicle speed to that for a reply operation only for a certain period of time when a speed limit is changed.

CITATION LIST

Patent Literature

[PTL1] Japanese Patent Application Laid-Open "kokai" No. 2013-203379

SUMMARY OF INVENTION

However, a change of a speed limit in a run way may be detected while a driver is increasingly or decreasingly changing (increasingly and decreasingly adjusting) upper-limit vehicle speed by switch operation. In this case, a vehicle speed limiting device may recognize the driver's switch operation as a reply to change proposal of upper-limit vehicle speed even though the driver thinks that he or she is changing upper-limit vehicle speed by the switch operation. In that case, upper-limit vehicle speed different from an intention of the driver will be set.

The present invention has been made in order to solve the above-mentioned problem, and an objective of the present invention is to prevent upper-limit vehicle speed from being set as speed different from an intention of a driver.

In order to attain the above-mentioned objective, a feature of the present invention is in that:

a vehicle speed limiting device (10, 20, 30) which acquires a speed limit of a vehicle in a run way, sets up upper-limit vehicle speed that is an upper limit of vehicle speed based on said acquired speed limit, and controls driving force so that said vehicle speed does not exceed said upper-limit vehicle speed, comprises:

an upper-limit vehicle speed change operation unit (50) that is an operation unit for changing said upper-limit vehicle speed to a desired value in accordance with a driver's operation, a function switching means (S13, S14, S31, S37) which temporarily switches function of said upper-limit vehicle speed change operation unit from a first function that changes said upper-limit vehicle speed to the desired value in accordance with a driver's operation to a second function that replies whether a change of said speed limit is accepted in accordance with a driver's operation, at a timing when said acquired speed limit is switched, and a function switching prohibition means (S11, S12, S21, S25, S25', S26) which prohibits the function of said upper-limit vehicle speed change operation unit from being switched to said second function, even if said acquired speed limit is switched, until a predetermined prohibition release timing comes after said upper-limit vehicle speed change operation unit operates with said first function.

A vehicle speed limiting device according to the present invention acquires a speed limit of a vehicle in a run way, sets up upper-limit vehicle speed which is an upper limit of vehicle speed based on the acquired speed limit, and controls driving force so that the vehicle speed does not exceed the upper-limit vehicle speed. In this case, the vehicle speed limiting device may be configured to set the speed limit itself as the upper-limit vehicle speed, and may be configured to set speed obtained by adjusting the speed limit as the upper-limit vehicle speed. Moreover, although the vehicle speed limiting device controls driving force so that the vehicle speed does not exceed the upper-limit vehicle speed, it may be configured to further control braking force.

The vehicle speed limiting device comprises the upper-limit vehicle speed change operation unit for changing upper-limit vehicle speed into a desired value. Therefore, a driver can operate the upper-limit vehicle speed change operation unit to arbitrarily change the upper-limit vehicle speed. The vehicle speed limiting device controls driving force so that the vehicle speed does not exceed the upper-limit vehicle speed changed with the upper-limit vehicle speed change operation unit.

It is not necessarily preferable for a driver that the upper-limit vehicle speed is changed whenever the speed limit is changed. Therefore, the vehicle speed limiting device comprises the function switching means which temporarily switches function of the upper-limit vehicle speed change operation unit from a first function that changes the upper-limit vehicle speed to the desired value in accordance with a driver's operation to a second function that replies whether a change of the speed limit is accepted in accordance with a driver's operation, at a timing when the acquired speed limit is switched. Therefore, the driver can reply whether a change of the speed limit is accepted, i.e., whether the upper-limit vehicle speed may be set automatically based on the changed speed limit, using the upper-limit vehicle speed change operation unit, when the speed limit is switched. Therefore, in the vehicle speed limiting device according to the present invention, the upper-limit vehicle speed change operation unit can be used for both a change operation of upper-limit vehicle speed and a reply operation about whether the speed limit may be accepted.

When the speed limit is changed while the driver is performing a change operation of the upper-limit vehicle speed using the upper-limit vehicle speed change operation unit, there is a possibility that the operation by the driver may be recognized as a reply operation about whether change of the speed limit is accepted, despite an intention of the driver. Therefore, in the vehicle speed limiting device according to the present invention, the function switching prohibition means prohibits the function of the upper-limit vehicle speed change operation unit from being switched to the second function, even if the acquired speed limit is switched, until a predetermined prohibition release timing comes after the upper-limit vehicle speed change operation unit operates with the first function. Accordingly, the vehicle speed limiting device can recognize that the operation by the driver is a change operation of the upper-limit vehicle speed, in accordance with the setting of the prohibition release timing, even if the speed limit is switched while the driver is performing a sequence of the change operation of the upper-limit vehicle speed using the upper-limit vehicle speed change operation unit.

As a result, in accordance with the present invention, upper-limit vehicle speed can be prevented from being set to speed different from an intention of a driver.

A feature of one aspect of the present invention is in that:
said predetermined prohibition release timing comes when elapsed time after said upper-limit vehicle speed change operation unit operates with said first function reaches predetermined setup time (ta0).

In accordance with the one aspect of the present invention, when a driver operates the upper-limit vehicle speed change operation unit to change the upper-limit vehicle speed, the function of the upper-limit vehicle speed change operation unit is not switched to the second function, even if the speed limit is switched, while the elapsed time from the operation does not reach the predetermined setup time. Therefore, while the driver is performing a sequence of the change operation of the upper-limit vehicle speed, the vehicle speed limiting device can recognize that the operation of the driver is the change operation of the upper-limit vehicle speed, even if the speed limit is switched. As a result, in accordance with the present invention, the upper-limit vehicle speed can be prevented from being set to speed different from an intention of a driver.

A feature of one aspect of the present invention is in that:
said predetermined prohibition release timing comes when running distance of the vehicle after said upper-limit vehicle speed change operation unit operates with said first function reaches predetermined setup distance (d0).

In accordance with the one aspect of the present invention, when a driver operates the upper-limit vehicle speed change operation unit to change the upper-limit vehicle speed, the function of the upper-limit vehicle speed change operation unit is not switched to the second function, even if the speed limit is switched, while the running distance from the operation does not reach the predetermined setup distance. Therefore, while the driver is performing a sequence of the change operation of the upper-limit vehicle speed, the vehicle speed limiting device can recognize that the operation of the driver is the change operation of the upper-limit vehicle speed, even if the speed limit is switched. As a result, in accordance with the present invention, the upper-limit vehicle speed can be prevented from being set to speed different from an intention of a driver. Moreover, running distance that the vehicle runs after the speed limit is changed before the function of the upper-limit vehicle speed change operation unit is switched to the second function can be restricted.

A feature of one aspect of the present invention is in that:
said predetermined prohibition release timing comes when elapsed time after said upper-limit vehicle speed change operation unit operates with said first function reaches predetermined setup time or when running distance of the vehicle after said upper-limit vehicle speed change operation unit operates with said first function reaches predetermined setup distance, whichever comes first.

In accordance with the one aspect of the present invention, when a driver operates the upper-limit vehicle speed change operation unit to change the upper-limit vehicle speed, the function of the upper-limit vehicle speed change operation unit is switched from the first function to the second function, at an earlier timing between a timing when elapsed time after the operation reaches predetermined setup time and a timing when running distance of the vehicle after the operation reaches predetermined setup distance. Therefore, the function of the upper-limit vehicle speed change operation unit can be further properly switched from the first function to the second function without delay.

A feature of one aspect of the present invention is in that:
said vehicle speed limiting device further comprises a display means (40, 41) which displays a first display screen (D1) showing an upper-limit vehicle speed at present during a period when said upper-limit vehicle speed change operation unit operates with the first function, and displays a second display screen (D2) showing said switched new speed limit and a reply operation method about whether a change of said speed limit is accepted, in addition to said upper-limit vehicle speed, during a period when said upper-limit vehicle speed change operation unit operates with the second function.

In the one aspect of the present invention, the display means displays the first display screen which shows an upper-limit vehicle speed at present during a period when the function of the upper-limit vehicle speed change operation unit operates with the first function. Moreover, the display means displays the second display screen which shows the switched new speed limit and a reply operation method about whether a change of the new speed limit is accepted, in addition to the upper-limit vehicle speed, during a period when the upper-limit vehicle speed change operation unit operates with the second function. Therefore, the driver can learn a fact that the speed limit has been switched and the reply operation method about whether the change of the new speed limit is accepted, by the second display screen. Thereby, the driver can easily perform the reply operation for setting the upper-limit vehicle speed as he or she wishes.

A feature of one aspect of the present invention is in that:
said display means displays only an operation method for accepting a change of said speed limit as the reply operation method displayed in said second display screen, and
said vehicle speed limiting device further comprises an automatic reply receipt means (20) which judges that a driver rejects to accept a change of said speed limit when said upper-limit vehicle speed change operation unit is not operated during a period when said upper-limit vehicle speed change operation unit operates with said second function (S36).

In the one aspect of the present invention, the display means displays only an operation method for accepting a change of the speed limit as the reply operation method displayed in the second display screen. Therefore, the driver operates the upper-limit vehicle speed change operation unit in accordance with the displayed operation method, when the driver wishes to accept a change of the speed limit. When the upper-limit vehicle speed change operation unit is not operated during a period when the function of the upper-limit vehicle speed change operation unit operates with the second function, the automatic reply receipt means judges that the driver rejects to accept a change of the speed limit. For this reason, the driver just has to operate the upper-limit vehicle speed change operation unit, only when he or she wishes to accept a change of the speed limit. Therefore, user-friendliness of the upper-limit vehicle speed change operation unit can be improved.

A feature of one aspect of the present invention is in that: said vehicle speed limiting device further comprises a functional reversion means which reverts the function of said upper-limit vehicle speed change operation unit from said second function to said first function, at a timing when said upper-limit vehicle speed change operation unit operates with said second function.

In accordance with the one aspect of the present invention, the function of the upper-limit vehicle speed change operation unit is reverted to the first function at a timing when the driver performs the reply operation about whether he or she accepts a change of the speed limit. Therefore, the function of the upper-limit vehicle speed change operation unit can be reverted to the first function at a suitable timing. Moreover, since an excessive operation by a driver is not needed, it is user-friendly.

In the above-mentioned explanation, in order to help understanding of the present invention, reference signs used in embodiments thereof in parenthesis are attached to the configuration of the invention corresponding to the embodiments. However, respective constituent elements of the present invention are not limited to the embodiments specified with the above-mentioned reference signs.

DESCRIPTION OF EMBODIMENTS

Figure 1:
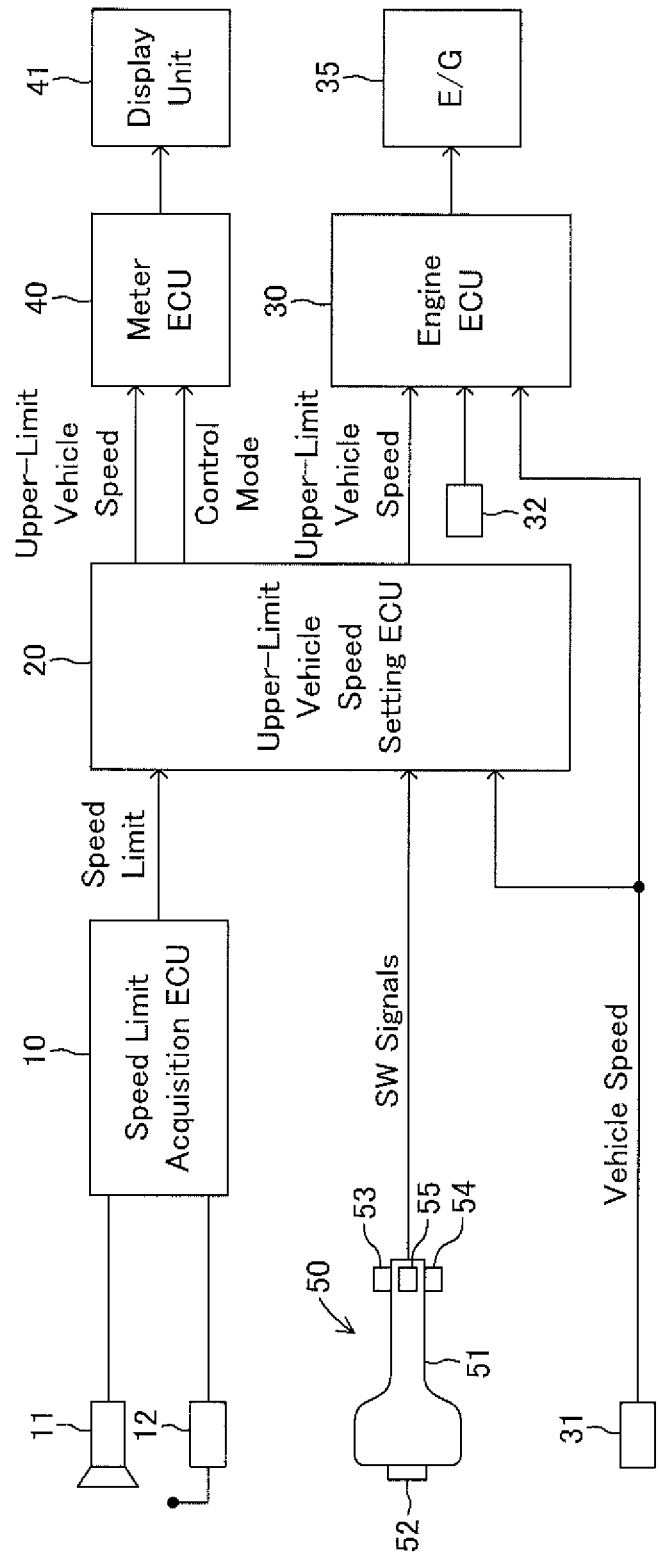
FIG. 1 is a schematic configuration diagram of a vehicle speed limiting device according to the present embodiment.

Hereafter, embodiments of the present invention will be described in detail using drawings. FIG. 1 is a schematic system configuration diagram of a vehicle speed limiting device according to the present embodiment.

A vehicle speed limiting device is a device which sets up upper-limit vehicle speed that is an upper limit of running speed of a vehicle and controls driving force so that the running speed does not exceed this upper-limit vehicle speed. The vehicle speed limiting device comprises a speed limit acquisition ECU 10, an upper-limit vehicle speed setting ECU 20, an engine ECU 30, a meter ECU 40, and an ASL operation unit 50. Here, "ECU" is an abbreviation for Electric Control Unit. Each of the ECUs 10, 20, 30 and 40 comprises a microcomputer as a principal part. Moreover, although the upper-limit vehicle speed setting ECU 20 and the engine ECU 30 are prepared separately in the present embodiment, the function of the upper-limit vehicle speed setting ECU 20 may be incorporated in the engine ECU 30. Moreover, for performing vehicle speed limit control, the vehicle speed limiting device may additionally comprise a means for controlling braking force of wheels (for example, a brake system).

The speed limit acquisition ECU 10 is an electric control unit for acquiring a speed limit in a run way where a vehicle is running at present, and is connected to an in-vehicle camera 11 and a navigation device 12. The in-vehicle camera 11 comprises an image sensor, such as CCD and CMOS, take an image of foreground of the vehicle, and transmits information of the picturized image to the speed limit acquisition ECU 10. The speed limit acquisition ECU 10 has an image-analysis function, receives the picture information outputted from the in-vehicle camera 11, recognizes a road sign (a road marking may be used) from the picturized image, and acquires a speed limit (legal speed limit) denoted by the road sign. Therefore, the speed limit acquisition ECU 10 acquires a speed limit displayed on a road sign disposed anterior to the vehicle by always receiving the picture information transmitted from the in-vehicle camera 11 and conducting an image analysis during the vehicle is running.

The navigation device 12 comprises a GPS receiver which detects a location of a self-vehicle, a storage unit which memorizes map information and road information, and a communication apparatus acquires latest information of the map information and the road information from outside. Speed limit information is included in the road information. Based on the location of the self-vehicle and the road information on a map, the navigation device 12 extracts the speed limit information which represents a speed limit in a run way where the vehicle is presently running, and outputs the extracted speed limit information to the speed limit acquisition ECU 10.

In addition, the navigation device 12 may be a wireless-communication terminal unit which does not comprise the storage unit for memorizing the map information and the road information and sequentially receives those latest information from an external information provision equipment.

When the speed limit acquisition ECU 10 acquires a speed limit in this way, it outputs the acquired speed limit to the upper-limit vehicle speed setting ECU 20. In addition, although both the in-vehicle camera 11 and the navigation device 12 are prepared in order to acquire a speed limit in the present embodiment, only one of them may be prepared. Moreover, the speed limit acquisition ECU may be configured to adopt a speed limit acquired by a device (the in-vehicle camera 11 or the navigation device 12) with higher priority which is predetermined, and may be configured to adopt lower one or higher one between the two speed limits, when a speed limit acquired from the picturized image of the in-vehicle camera 11 and a speed limit acquired from the navigation device 12 do not coincide with each other.

The ASL operation unit 50 is connected to the upper-limit vehicle speed setting ECU 20. The ASL operation unit 50 is an operation unit for serving a double purpose, i.e., setting of upper-limit vehicle speed which is an upper limit of running speed of a vehicle and setting about whether a change of the speed limit is accepted when a speed limit is changed.

Figure 2:
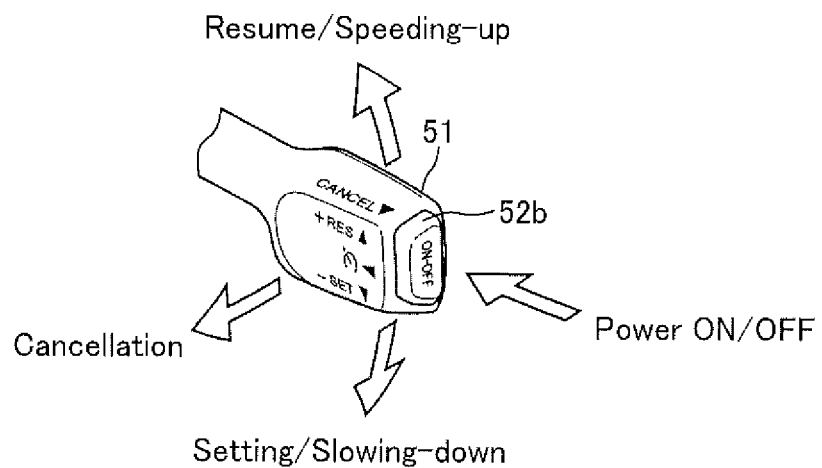
FIG. 2 is an explanatory diagram for showing an operation method of an ASL operation unit.

This ASL operation unit 50 has its base attached to a back side of a steering handle, and comprises a control lever 51 whose tip extends toward outside in a radial direction of the steering handle. As shown in FIG. 2, the control lever 51 is configured so that its tip can be swingingly operated upward, downward and to nearside from a driver's side (in a driver's eyes). The ASL operation unit 50 comprises a main switch 52 disposed at the tip of the control lever 51, a resume/speeding-up switch 53 which is turned on by operation of the control lever, a setting/slowing-down switch 54, and a cancellation switch 55. Hereafter, operation direction of the ASL operation unit 50 means a direction seen from a driver sitting down to a driver's seat.

In the ASL operation unit 50, the switches other than the main switch 52 are configured so that a switch pushed in an operation direction is turned on only while the control lever 51 is operated by a driver and the control lever 51 is returned to its initial position and all the switches 53, 54 and 55 is turned off when the driver releases his or her hand from the control lever 51. In the present embodiment, as shown in FIG. 2, it is configured so that the resume/speeding-up switch 53 is turned on when the tip of the control lever 51 is raised upward, the setting/slowing-down switch 54 is turned on when the tip of the control lever is depressed downward, and the cancellation switch 55 is turned on when the tip of the control lever is drawn nearside (driver side). Moreover, the main switch 52 is a master electrical switch which is switched between an on-state and an off-state changes whenever a push operation of an operation button 52b prepared at the tip of the control lever 51 is carried out.

The upper-limit vehicle speed setting ECU 20 is an electric control unit which determines an upper-limit vehicle speed that is an upper limit of running speed of a vehicle based on a speed limit outputted from the speed limit acquisition ECU 10 and a switch signal outputted from the ASL operation unit 50. In addition, the upper-limit vehicle speed setting ECU 20 is configured to be able to hold a memory of a speed limit in a run way where the vehicle is running and detect that a speed limit is changed even when the speed limit is changed during the vehicle is running, as will be mentioned later.

The upper-limit vehicle speed setting ECU 20 performs speed limit control when the main switch 52 of the ASL operation unit 50 is turned on, and does not perform speed limit control when the main switch 52 is turned off. Therefore, the driver can choose the existence of an execution of speed limit control by operation of the main switch 52. Moreover, the switches which are switched between an on-state and an off-state by operation of the control lever 51 (resume/speeding-up switch, setting/slowing-down switch, cancellation switch) functions only when the main switch 52 is turned on. In addition, vehicle speed limit control itself is carried out by the engine ECU 30. Therefore, the upper-limit vehicle speed setting ECU 20 makes the engine ECU 30 perform speed limit control by instructing upper-limit vehicle speed used in the speed limit control to the engine ECU 30.

The upper-limit vehicle speed setting ECU 20 is connected to a speed sensor 31 which detects vehicle speed. The upper-limit vehicle speed setting ECU 20 sets up actual vehicle speed (vehicle speed detected by the speed sensor 31) as upper-limit vehicle speed at a time point when the setting/slowing-down switch 54 is turned on, when the setting/slowing-down switch 54 is turned on in a state that the main switch 52 is turned on. Moreover, the upper-limit vehicle speed setting ECU 20 decreases upper-limit vehicle speed with decrement according to one lever operation time, when the setting/slowing-down switch 54 is turned on in a state that upper-limit vehicle speed is set.

For example, the upper-limit vehicle speed setting ECU 20 decreases the upper-limit vehicle speed by a predetermined small decrement of speed (for example, 1 km/h) for one lever operation, when the control lever 51 is instantly operated downward (when duration in which the setting/slowing-down switch 54 is turned on is shorter than a predetermined time (for example, 0.5 second)). Moreover, the upper-limit vehicle speed setting ECU 20 decreases the upper-limit vehicle speed by a predetermined large decrement of speed (for example, 5 km/h) for one lever operation, when the control lever 51 is continuously operated downward for a predetermined time or more (when duration in which the setting/slowing-down switch 54 is turned on is a predetermined time (for example, 0.5 second) or more). The upper-limit vehicle speed setting ECU 20 changes the upper-limit vehicle speed in the speed limit control and memorizes the changed upper-limit vehicle speed at a time point when the setting/slowing-down switch 54 is switched from an on-state to an off-state.

Moreover, the upper-limit vehicle speed setting ECU 20 increases the upper-limit vehicle speed by an increment according to one lever operation time, when the resume/speeding-up switch 53 is turned on in a state that the upper-limit vehicle speed is set. For example, when the upper-limit vehicle speed setting ECU 20 increases the upper-limit vehicle speed by a predetermined small increment of speed (for example, 1 km/h) for one lever operation, when the control lever 51 is instantly operated upward (when duration in which the resume/speeding-up switch 53 is turned on is shorter than a predetermined time (for example, 0.5 second)). Moreover, the upper-limit vehicle speed setting ECU 20 increases the upper-limit vehicle speed by a predetermined large increment of speed (for example, 5 km/h) for one lever operation, when the control lever 51 is continuously operated upward for a predetermined time or more (when duration in which the resume/speeding-up switch 53 is turned on is a predetermined time (for example, 0.5 second) or more). The upper-limit vehicle speed setting ECU 20 changes the upper-limit vehicle speed in the speed limit control and memorizes the changed upper-limit vehicle speed at a time point when the resume/speeding-up switch 53 is switched from an on-state to an off-state.

Moreover, the upper-limit vehicle speed setting ECU 20 cancels an execution of the speed limit control, when the cancellation switch 55 is turned on or when the main switch 52 is turned off, during an execution of the speed limit control. In addition, the upper-limit vehicle speed setting ECU 20 holds a memory of the upper-limit vehicle speed at that time when the cancellation switch 55 is turned on, and deletes a memory of the upper-limit vehicle speed at that time when the main switch 52 is turned off.

Moreover, the upper-limit vehicle speed setting ECU 20 resumes the speed limit control using the upper-limit vehicle speed memorized when the cancellation switch 55 is turned on, in a case where the resume/speeding-up switch 53 is turned on after release of the speed limit control by the cancellation switch 55 being turned on.

The upper-limit vehicle speed setting ECU 20 has a function to automatically set the upper-limit vehicle speed based on the speed limit acquired from the speed limit acquisition ECU 10, in addition to a function to set the upper-limit vehicle speed by operation of the ASL operation unit 50 as mentioned above. For example, the upper-limit vehicle speed setting ECU 20 sets the speed limit acquired from the speed limit acquisition ECU 10 as the upper-limit vehicle speed, and changes the upper-limit vehicle speed according to the speed limit whenever a change of the speed limit is detected. In this case, it is not limited to a configuration wherein the speed limit is directly set as the upper-limit vehicle speed, the upper-limit vehicle speed may be set, in accordance with an arbitrary rule, based on the speed limit. For example, a value obtained by adding an off-set value (which may be a positive value or a negative value) to the speed limit may be set as the upper-limit vehicle speed. In this case, when the acquired speed limit is 60 km/h and the off-set value is −3 km/h, the upper-limit vehicle speed is set to 57 km/h.

Even when the upper-limit vehicle speed is set based on the speed limit as mentioned above, the driver can adjust the upper-limit vehicle speed by operating the ASL operation unit 50. The upper-limit vehicle speed setting ECU 20 transmits the upper-limit vehicle speed finally adjusted by the driver to the engine ECU 30 and the meter ECU 40. The upper-limit vehicle speed setting ECU 20 transmits the upper-limit vehicle speed in a predetermined period, while the main switch 52 of the ASL operation unit 50 is in an on-state and the upper-limit vehicle speed is set. Moreover, the upper-limit vehicle speed setting ECU 20 also transmits a control mode signal to meter ECU 40, in addition to the upper-limit vehicle speed. This control mode signal will be mentioned later.

The engine ECU 30 controls driving force of the engine 35 so that vehicle speed of a self-vehicle does not exceed the upper-limit vehicle speed while the upper-limit vehicle speed is transmitted in the predetermined period from the upper-limit vehicle speed setting ECU 20. That is, speed limit control is carried out. The engine ECU 30 is connected to the speed sensor 31 which detects the vehicle speed and an accelerator sensor 32 which detects an accelerator operation amount. The engine ECU 30 calculates driver demand driving force based on the vehicle speed detected by the speed sensor 31 (referred to as actual vehicle speed) and the accelerator operation amount detected by the accelerator sensor 32, and controls an operation of the engine 35 so as to generate this driver demand driving force. In this case, when it is predicted that the actual vehicle speed exceeds the upper-limit vehicle speed, the engine ECU 30 controls the operation of the engine 35 so that the actual vehicle speed does not exceed the upper-limit vehicle speed, by decreasing an opening of a throttle valve which adjusts an amount of air intake of the engine 35, or by limiting an amount of fuel injection to the engine 35.

The meter ECU 40 is connected to a display unit 41 disposed at a location which can be sighted from a driver's seat. The meter ECU 40 displays the upper-limit vehicle speed transmitted from the upper-limit vehicle speed setting ECU 20, while carrying out the speed limit control. Thereby, the driver can recognize a fact that the speed limit control is in execution and the upper-limit vehicle speed in the speed limit control.

By the way, it is not necessarily preferable for a driver that upper-limit vehicle speed is changed whenever a speed limit is changed. Therefore, the vehicle speed limiting device according to the present embodiment is configured to inquire of the driver about whether the speed limit may be accepted or not, i.e., about whether the upper-limit speed may be set automatically based on the changed speed limit (by reflecting the speed limit), when a change of the speed limit transmitted from the speed limit acquisition ECU 10 is detected.

In the present embodiment, it is configured so that the driver is inquired about whether the speed limit may be accepted using the display unit 41 and the driver can reply to this inquiry by an operation of the ASL operation unit 50. Therefore, the ASL operation unit 50 is used for both an adjustment operation of the above-mentioned upper-limit vehicle speed and the reply operation about whether the speed limit may be accepted.

Figure 3:
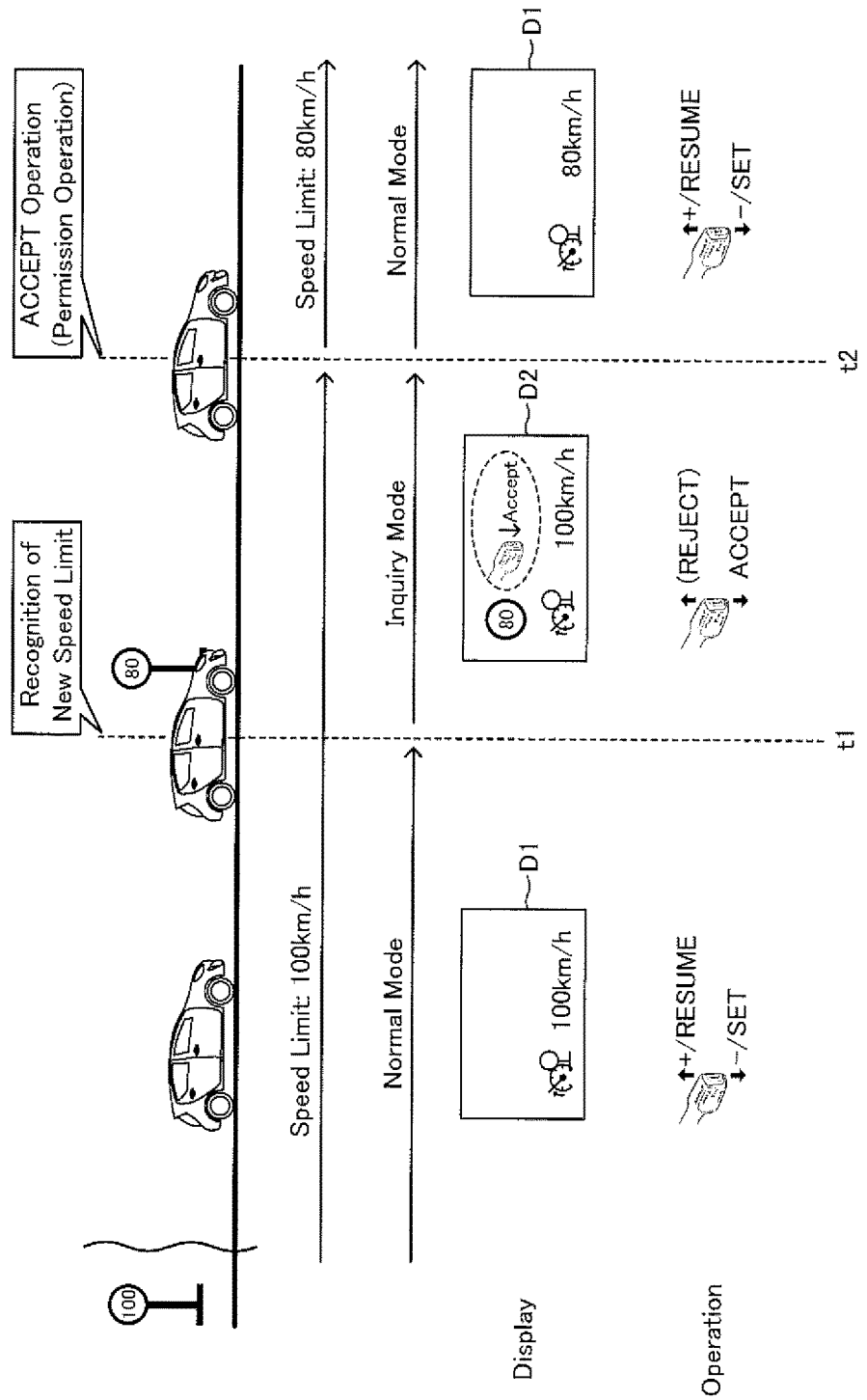
FIG. 3 is an explanatory diagram for explaining switching of display and an operation method accompanying a change of a speed limit.

For example, a case where the upper-limit vehicle speed setting ECU 20 recognizes that the speed limit is changed into 80 km/h at time t1 while the vehicle is running on a road with a speed limit of 100 km/h and the upper-limit vehicle speed in the speed limit control is set to 100 km/h, as shown in FIG. 3, will be explained below. In this case, the upper-limit vehicle speed setting ECU 20 does not change the upper-limit vehicle speed into 80 km/h immediately, but temporarily switches a mode regarding announce to the driver in the speed limit control (hereafter, referred to as a control mode) from a previous normal mode to an inquiry mode.

The upper-limit vehicle speed setting ECU 20 transmits upper-limit vehicle speed at present and a normal mode signal (signal showing that it is in the normal mode), which is a control mode signal, to the meter ECU 40, when a change of the speed limit is not detected (before the time t1) during the speed limit control is performed. On the other hand, when the change of the speed limit is detected (at the time t1 or later), the upper-limit vehicle speed setting ECU 20 temporarily switches the control mode signal from the normal mode signal to an inquiry mode signal (signal showing that it is in the inquiry mode). Information representing the speed limit whose change has been detected is also included in this inquiry mode signal.

When the normal mode signal is received from the upper-limit vehicle speed setting ECU 20, the meter ECU 40 displays a normal display screen D1 on the display unit 41, as shown in the left side of FIG. 2. On this normal display screen D1, the upper-limit vehicle speed at present is displayed. Moreover, when the inquiry mode signal is received from the upper-limit vehicle speed setting ECU 20, the meter ECU 40 displays an inquiry display screen D2 on the display unit 41, as shown in the center of FIG. 2. On this inquiry display screen D2, the newly recognized speed limit (newly switched speed limit) and the operation method for replying whether a change of the speed limit is permitted or rejected are displayed, in addition to display elements on the normal display screen D1.

As mentioned above, the ASL operation unit 50 is used for both an adjustment operation of the upper-limit vehicle speed and a reply operation about whether the speed limit may be accepted. For this reason, the upper-limit vehicle speed setting ECU 20 is configured to switch a function to be performed according to an operation to the ASL operation unit 50 which the driver performs, between the normal mode and the inquiry mode. In the normal mode, the upper-limit vehicle speed setting ECU 20 increases/decreases the upper-limit vehicle speed based on an upward/downward lever operation of the ASL operation unit 50, as mentioned above. Such a function of the ASL operation unit 50 is referred to as a first function. On the other hand, in the inquiry mode, the upper-limit vehicle speed setting ECU 20 permits an acceptance of the speed limit based on one of the upward and downward lever operations in the ASL operation unit 50, and rejects the acceptance of the speed limit based on the other of the upward and downward lever operations in the ASL operation unit 50. Such a function of the ASL operation unit 50 is referred to as a second function. Although it is configured so that the acceptance of the speed limit is permitted in response to the downward lever operation in the ASL operation unit 50 and the acceptance of the speed limit is rejected in response to the upward lever operation in the ASL operation unit 50 in the present embodiment, a relation between the directions of a lever operation and the functions (permission/rejection) may be set conversely.

For example, as shown in FIG. 3, when the speed limit transmitted from the speed limit acquisition ECU 10 is changed at the time t1, the upper-limit vehicle speed setting ECU 20 transmit an inquiry mode signal to the meter ECU 40 to display the display screen D2 on the display unit 41. At the same time, the upper-limit vehicle speed setting ECU 20 switches the function of the ASL operation unit 50 from the first function to the second function. The driver sees the inquiry display screen D2 displayed on the display unit 41, and operates downward the lever of the ASL operation unit when the driver thinks that the upper-limit vehicle speed may be automatically corrected based on the new speed limit. Thereby, the upper-limit vehicle speed is set based on the new speed limit. On the other hand, the driver operates upward the lever of the ASL operation unit 50 when the driver thinks that it is troublesome for the upper-limit vehicle speed to be automatically corrected based on the new speed limit, for example, when the driver does not wish to change the upper-limit vehicle speed. Thereby, the upper-limit vehicle speed is not changed. In the example shown in FIG. 3, a downward lever operation of the ASL operation unit 50 is carried out at the time t2, and the upper-limit vehicle speed is automatically corrected based on the new speed limit.

By the way, in the normal mode, the speed limit acquired by the speed limit acquisition ECU 10 may be changed while the driver operates the ASL operation unit 50 to adjust (increasingly or decreasingly change) the upper-limit vehicle speed. Although the change of the upper-limit vehicle speed may be completed by one tap operation of the ASL operation unit 50, a tap operation may be repeated until the upper-limit vehicle speed reaches a value that a driver wishes. In a case where a change of a speed limit has been recognized in the midst of such an operation of the ASL operation unit 50, the upper-limit vehicle speed setting ECU 20 recognizes the operation as a reply operation even though the driver intends to perform an adjustment operation of the upper-limit vehicle speed, since the function of the ASL operation unit 50 is switched from the first function to the second function when the control mode is switched from the normal mode to the inquiry mode at the same time as the recognition. For this reason, the setting of the upper-limit vehicle speed may become different from an intention of the driver.

Figure 4:
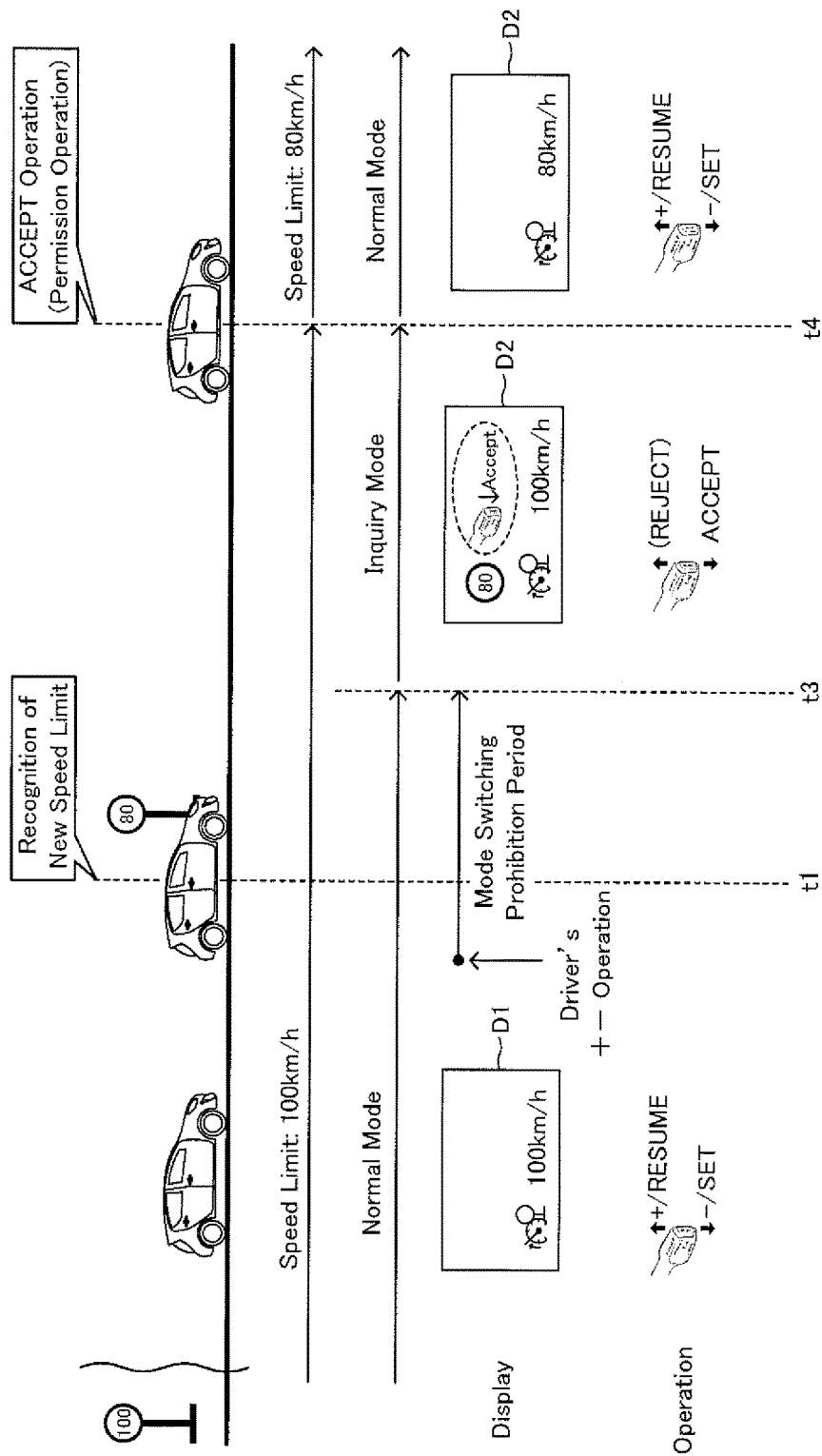
FIG. 4 is an explanatory diagram for explaining switching of display and an operation method accompanying a change of a speed limit.

Therefore, in the present embodiment, as shown in FIG. 4, when an operation of the ASL operation unit 50 is performed in the normal mode, i.e., when the ASL operation unit 50 operates as the first function, a mode switching prohibition period in which the control mode in the speed limit control is prohibited from being switched from the normal mode to the inquiry mode is placed while a certain period of time has not passed since the operation. For this reason, when the ASL operation unit 50 operates as the first function, the ASL operation unit 50 is restricted so that it is not switched to the second function while a certain period of time has not passed since that operation. Moreover, also in the display unit 41, when the ASL operation unit 50 operates as the first function, it is restricted so that it is not switched to the inquiry display screen D2 while a certain period of time has not passed since that operation.

Figure 5:
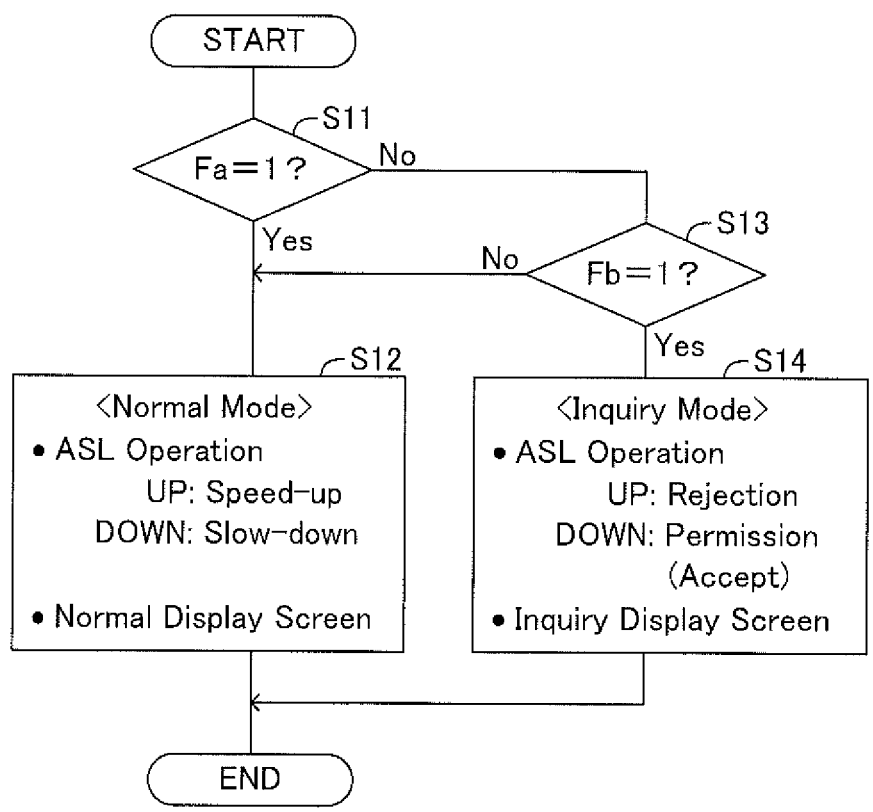
FIG. 5 is a flowchart for showing a mode switching control routine.
Figure 6:
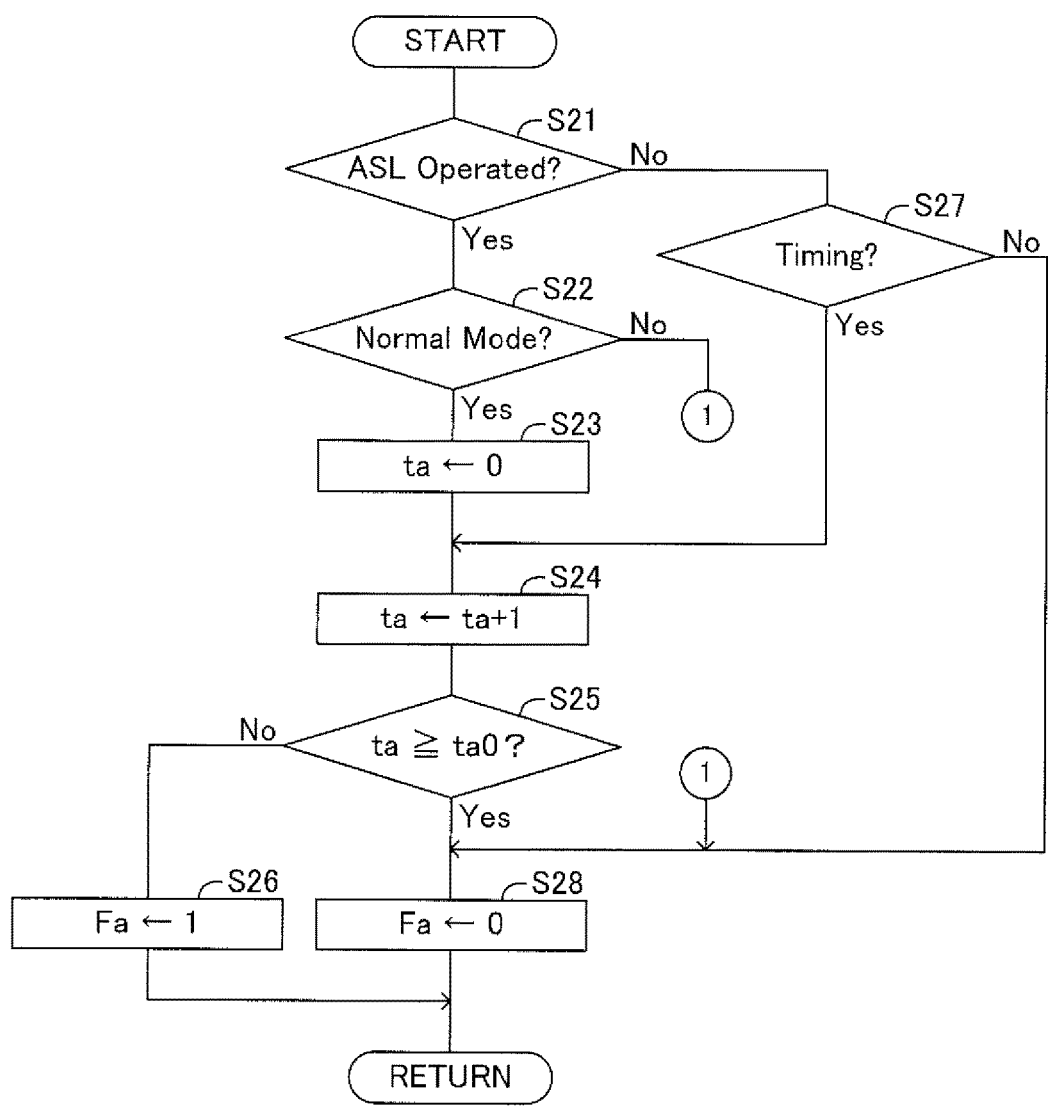
FIG. 6 is a flowchart for showing a prohibition flag setting routine.
Figure 7:
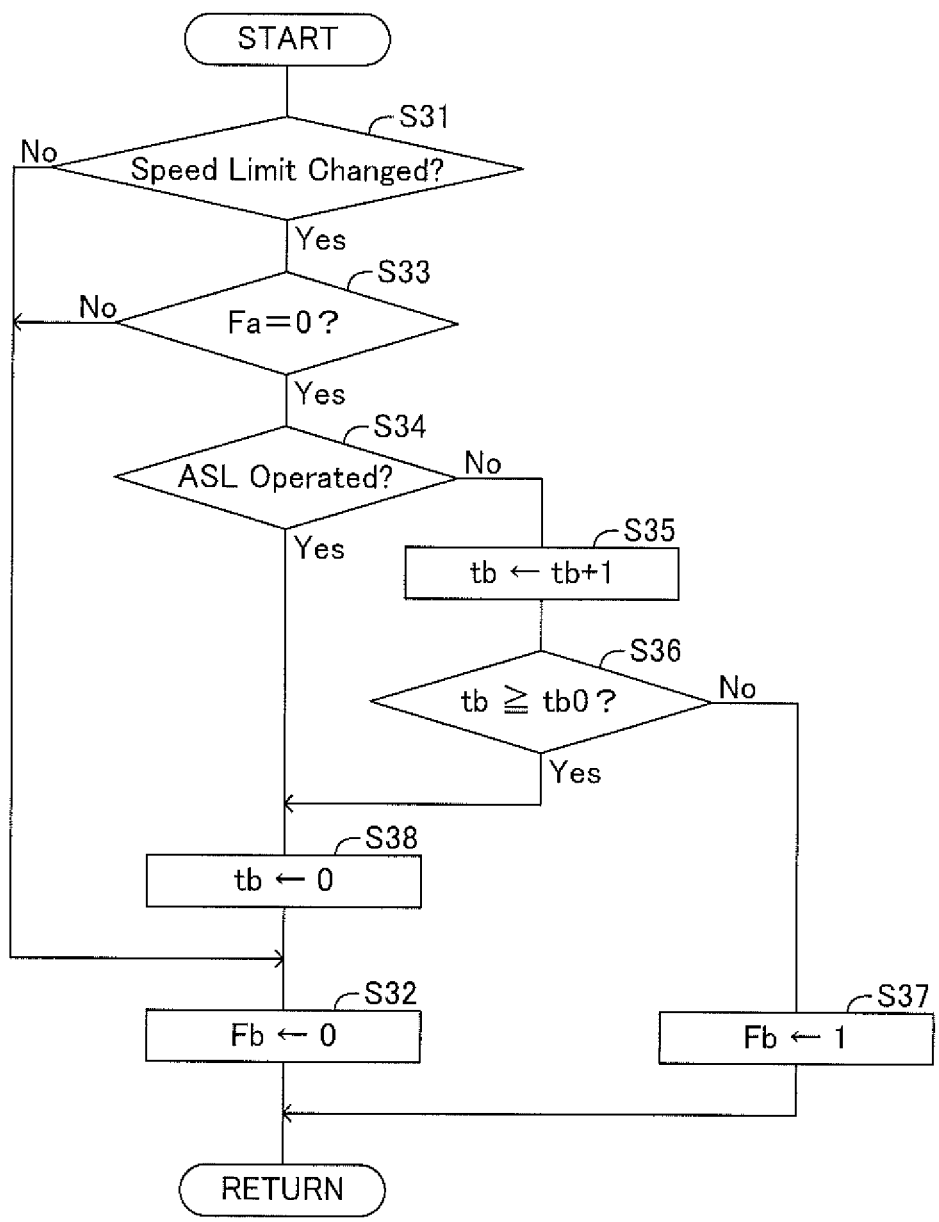
FIG. 7 is a flowchart for showing an inquiry mode flag setting routine.

Such a mode switching is carried out by the upper-limit vehicle speed setting ECU 20. FIG. 5 shows a mode switching control routine, FIG. 6 shows a prohibition flag setting routine, and FIG. 7 shows an inquiry mode flag setting routine. The upper-limit vehicle speed setting ECU 20 switches the control mode in the speed limit control by repeatedly carrying out these three routines in respectively predetermined operation periods.

The upper-limit vehicle speed setting ECU 20 performs the mode switching control routine shown in FIG. 5 to determine the control mode. In this mode switching control routine, the upper-limit vehicle speed setting ECU 20 determines the control mode based on a prohibition flag Fa set by the prohibition flag setting routine shown in FIG. 6 and an inquiry mode flag Fb set by the inquiry mode flag setting routine shown in FIG. 7. In addition, such processing is carried out in a state that the main switch 52 is turned on and in a state that the cancellation switch 55 is not operated as ON.

As will be understood from processing which will be mentioned later, the prohibition flag Fa with its value set as "1" shows that it is in a situation where switching from the normal mode to the inquiry mode is forbidden, and that with its value set as "0" shows that it is in a situation where switching from the normal mode to the inquiry mode is permitted. Moreover, the inquiry mode flag Fb with its value set as "1" shows that it is in a situation where the inquiry mode should be performed, and that with its value set as "0" shows that it is not in a situation where the inquiry mode should be performed. In addition, when the main switch 52 of the ASL operation unit 50 is turned on and the speed limit control is started, the prohibition flag Fa and the inquiry mode flag Fb are set to "0" as the initial values.

When the mode switching control routine is started up, the upper-limit vehicle speed setting ECU 20 judges whether the prohibition flag Fa is set to "1" in step S11, and sets the control mode to the normal mode in step S12 when the prohibition flag Fa is set to "1." On the other hand, when the prohibition flag Fa is set as "0", the upper-limit vehicle speed setting ECU 20 judges whether the inquiry mode flag Fb is set to "1" in step S13. The upper-limit vehicle speed setting ECU 20 proceeds the processing to step S14 and sets the control mode to the inquiry mode when the inquiry mode flag Fb is set to "1", and it proceeds the processing to step S12 and sets the control mode to the normal mode when the inquiry mode flag Fb is set to "0."

Therefore, the control mode is set to the normal mode regardless of the inquiry mode flag Fb, when the prohibition flag Fa is "1", i.e., it is in a situation where switching from the normal mode to the inquiry mode is forbidden. Moreover, when the prohibition flag Fa is "0", the control mode is set according to the inquiry mode flag Fb. Therefore, in the setting of the control mode, a priority is given to the prohibition flag Fa over the inquiry mode flag Fb.

Next, the prohibition flag setting routine (FIG. 6) which is processing for setting up the prohibition flag Fa will be explained. The upper-limit vehicle speed setting ECU 20 carries out the prohibition flag setting routine in parallel to the mode switching control routine. When the prohibition flag setting routine is started up, the upper-limit vehicle speed setting ECU 20 reads a switch signal of the ASL operation unit 50 and judges whether the ASL operation unit 50 is operated in step S21. As for the existence of an operation of the ASL operation unit 50, it is judged that the operation has been performed when the control lever 51 is operated upward or downward and thereafter is returned to its initial position. Therefore, in step S21, it is judged whether the resume/speeding-up switch 53 or setting/slowing-down switch 54 of the ASL operation unit 50 is turned from ON to OFF. Since this prohibition flag setting routine is repeated in a predetermined operation period, it is judged that the operation of the ASL operation unit 50 has been performed when the state of the switches 53 and 54 was ON one operation period before and the state of the switches 53 and 54 read in the current step S21 is OFF.

When it is judged that the operation of the ASL operation unit 50 has been performed, the upper-limit vehicle speed setting ECU 20 judges in step S22 whether the control mode at present is the normal mode, and advances the processing to step S23 when it is the normal mode. After resetting a timer value ta of a mode switching prohibition timer in step S23, the upper-limit vehicle speed setting ECU 20 increases the timer value ta by an increment of a value "1" in step S24. Then, the upper-limit vehicle speed setting ECU 20 judges whether the timer value ta reaches a switching prohibition switching prohibition setup time ta0 in step S25. The switching prohibition setup time ta0 is a certain period of time (>0) predetermined as a period of time in which switching from the normal mode to the inquiry mode is forbidden.

When the timer value ta does not reach the switching prohibition setup time ta0, the upper-limit vehicle speed setting ECU 20 sets the prohibition flag Fa to "1" in step S26, and once ends the prohibition flag setting routine. The upper-limit vehicle speed setting ECU 20 repeats the prohibition flag setting routine in a short predetermined operation period. Therefore, since the first operation of the ASL operation unit 50 has been completed when the prohibition flag setting routine is resumed, it is judged as "No" in step S21 serves and the upper-limit vehicle speed setting ECU 20 advances the processing to step S27.

The upper-limit vehicle speed setting ECU 20 judges in step S27 whether mode switching prohibition timer is in an execution of timing, and advances the processing to step S24 and carries out the above-mentioned processing when the mode switching prohibition timer is in an execution of timing, i.e., when the timer value ta has not yet reached the switching prohibition setup time ta0. When such processing is repeated and the timer value ta reaches the switching prohibition setup time ta0 (S25: Yes), the upper-limit vehicle speed setting ECU 20 sets the prohibition flag Fa to "0" in step S28, and once ends the prohibition flag setting routine. Therefore when an operation of the ASL operation unit 50 is detected in the normal mode, the prohibition flag Fa is set to "1" until the switching prohibition setup time ta0 has passed since the operation is detected.

Moreover, when the driver operates the ASL operation unit 50 again while the mode switching prohibition timer is in an execution of timing, the timer value ta is reset at the time (S23), and timing is resumed (S24). Therefore, the prohibition flag Fa is set to "1" until the switching prohibition setup time ta0 has passed since a time point when an operation of the ASL operation unit 50 is detected last time, and it is switched to "0" after the switching prohibition setup time ta0 has passed. Moreover, when the mode switching prohibition timer is not timing (S27: No), the prohibition flag Fa is set to "0."

Moreover, when the control mode is not the normal mode in step S22, i.e., when it is the inquiry mode, the prohibition flag Fa is set to "0."

Next, the inquiry mode flag setting routine (FIG. 7) which is processing for setting up the inquiry mode flag Fb will be explained. The upper-limit vehicle speed setting ECU 20 carries out the inquiry mode flag setting routine in parallel to the mode switching control routine.

When the inquiry mode flag setting routine is started up, the upper-limit vehicle speed setting ECU 20 reads the speed limit transmitted from the speed limit acquisition ECU 10 and judges whether the speed limit has been changed in step S31. In this judgment in step S31, the speed limit read this time and the speed limit which the upper-limit vehicle speed setting ECU 20 has memorized in the memory are compared, and it is judged that the speed limit has been changed when they are different from each other. When the speed limit has not been changed, the upper-limit vehicle speed setting ECU 20 advances the processing to step S32, sets the inquiry mode flag Fb to "0", and once ends the inquiry mode flag setting routine.

The upper-limit vehicle speed setting ECU 20 repeats such processing in a predetermined operation period. And, when judged that the speed limit detected by the speed limit acquisition ECU 10 has been changed, the upper-limit vehicle speed setting ECU 20 advances the processing to step S33. In addition, although the upper-limit vehicle speed setting ECU 20 memorizes the changed speed limit in a memory, it holds a judgment that the speed limit has been changed until the reply about whether the speed limit is accepted is determined, in step S31.

The upper-limit vehicle speed setting ECU 20 reads the prohibition flag Fa in step S33, judges whether the prohibition flag Fa is "0", and advances the processing to step S32, sets the inquiry mode flag Fb to "0", and once ends this routine when the prohibition flag Fa is "1" (S33: No). On the other hand, when the prohibition flag Fa is "0", the upper-limit vehicle speed setting ECU 20 advances the processing to step S34. Therefore, when the prohibition flag Fa is not "0", the processing is advanced to step S34 after waiting until the prohibition flag Fa is set to "0."

The upper-limit vehicle speed setting ECU 20 judges whether the operation with the ASL operation unit 50 has been performed in step S34. In this case, the upper-limit vehicle speed setting ECU 20 reads the switch signals of the resume/speeding-up switch 53 and the setting/slowing-down switch 54 of the ASL operation unit 50, and judges whether the upward operation or downward operation of the control lever 51 has been performed. The upper-limit vehicle speed setting ECU 20 starts up an inquiry timing timer and increases its timer value tb by an increment of a value "1", in step S35, when the operation with the ASL operation unit 50 has not been detected (S34: No). In addition, the initial value of the inquiry timing timer is set to zero.

Then, the upper-limit vehicle speed setting ECU 20 judges whether the timer value tb has reached an inquiry time limit tb0 in step S36. The inquiry time limit tb0 is a time limit of the inquiry mode, and is predetermined to a certain period of time (>0). When the timer value tb has not yet reached the inquiry time limit tb0 (S36: No), the upper-limit vehicle speed setting ECU 20 sets the inquiry mode flag Fb to "1" in step S37, and once ends the inquiry mode flag setting routine. Therefore, in this case, the inquiry mode is set.

The upper-limit vehicle speed setting ECU 20 repeatedly carries out such processing. Therefore, the operation of the ASL operation unit 50 judged in step S34 means the reply operation in the inquiry mode. When the driver operates the ASL operation unit 50 within the inquiry time limit tb0, the judgment in step S34 becomes "Yes", and the upper-limit vehicle speed setting ECU 20 clears the timer value tb to zero in step S38, thereafter advances the processing to step S32 and sets the inquiry mode flag Fb to "0," Therefore, when the driver does a reply operation using the ASL operation unit 50, the inquiry mode flag Fb is set to "0" at the time point.

While an operation of the ALS operation unit 50 is not detected, the increment of the timer value tb and the judgment in steps S35 and S36 are repeated. Then, when the timer value tb reaches the inquiry time limit tb0, i.e., when the inquiry time limit tb0 has passed while the driver does not operate the ASL operation unit 50, it is judged as "Yes" in step S36, the upper-limit vehicle speed setting ECU 20 advances the processing to step S38, clears the timer value tb to zero, and sets the inquiry mode flag Fb to "0" in subsequent step S32. Therefore, after the inquiry mode is set, even if the driver does not operate the ASL operation unit 50, the control mode is automatically returned to the normal mode when the inquiry time limit tb0 has passed.

The control mode is set by such three routines (the mode switching control routine, the prohibition flag setting routine, and the inquiry mode flag setting routine). For example, as shown in FIG. 3, in a case where long time has passed (a case where time not shorter than the switching prohibition setup time ta0 has passed) since the driver operates the ASL operation unit 50 last time, when a change of a speed limit is detected, the control mode is switched from the normal mode to the inquiry mode at the time point of the detection (time t1). When switched to the inquiry mode, the normal display screen D1 previously displayed on the display unit 41 is switched to the inquiry display screen D2. Moreover, the function of the ASL operation unit 50 is switched from the first function to the second function.

The driver is informed that the speed limit has been changed by the inquiry display screen D2. A reply operation method for replying whether setting of the upper-limit vehicle speed in which a new speed limit is reflected is permitted or rejected is also displayed on the inquiry display screen D2. In this example, it turns out that a permission reply is made when the ASL operation unit 50 is operated downward. During this inquiry mode, when the ASL operation unit 50 is operated upward or downward (S34: Yes), the inquiry mode flag Fb is set to "0" and the inquiry mode is switched to the normal mode at that time point. In addition, although only an operation direction for the permission reply is displayed on the inquiry display screen D2 as a reply operation direction in this example, the operation directions of both the permission reply and the rejection reply may be displayed.

At this time, the upper-limit vehicle speed setting ECU 20 changes the current upper-limit vehicle speed to the upper-limit vehicle speed based on a new speed limit, when the operation of the ASL operation unit 50 is an operation representing permission. On the other hand, the current upper-limit vehicle speed is maintained as it is, without reflecting a new speed limit, when an operation of the ASL operation unit 50 is an operation representing rejection.

Moreover, when the ASL operation unit 50 is not operated within the inquiry time limit tb after the inquiry mode is started, the control mode is switched to the normal mode at a time point when the inquiry time limit tb has passed (S36: Yes). In this case, the upper-limit vehicle speed setting ECU 20 considers that there was rejection as a reply of the driver, and does not change the upper-limit vehicle speed based on the new speed limit.

On the other hand, as shown in FIG. 4, when a change of a speed limit is detected in a situation where the switching prohibition setup time ta0 has not yet passed since the driver operates the ASL operation unit 50 last time (S25: No), since the prohibition flag Fa is set as "1" at that time point (S26), the control mode is not switched from the normal point to the inquiry mode. Then, when the switching prohibition setup time ta0 has passed since the ASL operation unit 50 is operated last time (S25: Yes), the prohibition flag Fa is set to "0" (S28). Thereby, in the inquiry mode flag setting routine, it is judged as "Yes" in step S33 and the processing from step S34 is started. Therefore, the control mode is switched from the normal mode to the inquiry mode and timing of the inquiry time limit tb is started at this time point (time t3). And, when an upward or downward operation of the ASL operation unit 50 is detected within the inquiry time limit tb, the control mode is returned to the normal mode at the time point (time t4). In addition, although FIG. 4 shows a case where a permission operation is performed, the upper-limit vehicle speed displayed on the display unit 41 is not changed, but it is maintained at 100 km/h in this example, when a rejection operation is performed.

Moreover, in a case where the ASL operation unit 50 is not operated within the inquiry time limit tb after the inquiry mode is started, the control mode is switched to the normal mode at a time point when the inquiry time limit tb has passed (S36: Yes). In this case, the upper-limit vehicle speed setting ECU 20 considers that there was rejection as a reply of the driver, and does not change the upper-limit vehicle speed based on the new speed limit.

In accordance with the above-mentioned vehicle speed limiting device according to the present embodiment, the control mode is not immediately switched to the inquiry mode, but the normal mode is continued, even when the speed limit acquired by the speed limit acquisition ECU 10 is changed while the driver is operating the ASL operation unit 50 to change the upper-limit vehicle speed. For this reason, the upper-limit vehicle speed is not changed based on a change of a speed limit against an intention of the driver.

Moreover, in a situation where the driver is not operating the ASL operation unit 50, the control mode is switched from the normal mode to the inquiry mode at timing when a change of the speed limit is detected. Therefore, the driver can change the upper-limit vehicle speed as needed, without being late for the change of the speed limit.

Moreover, in the inquiry mode, since the inquiry display screen D2 is displayed on the display unit 41, the driver can recognize a new speed limit and the reply operation method. Thereby, the driver can easily perform a reply operation for setting upper-limit vehicle speed which the driver wishes.

Moreover, in the inquiry mode, when the driver does not operate the ASL operation unit 50 in response to an inquiry, it is considered that a rejection reply was made when the inquiry time limit tb0 has passed. For this reason, the driver just has to operate the ASL operation unit 50 only when the driver wishes to accept a change of the speed limit. Therefore, user-friendliness of the ASL operation unit 50 can be improved.

Moreover, since the ASL operation unit 50 can perform both the adjustment operation of the upper-limit vehicle speed and the reply operation, it does not need to prepare separate operation units for respective operations, and low cost and space-saving can be attained. Moreover, a driver is prevented from being bewildered by an operation function and an operation method of the ASL operation unit 50, since a display screen displayed on the display unit 41 is switched according to the normal mode, in which the adjustment operation of the upper-limit vehicle speed is possible, and the inquiry mode, in which the reply operation is possible, as mentioned above.

<Modification 1 for Setting Mode Switching Prohibition Period>

In the above-mentioned embodiment, the upper-limit vehicle speed setting ECU 20 sets the prohibition flag Fa to "0" and permits switching to the inquiry mode at timing when elapsed time after the ASL operation unit 50 operates in the normal mode reaches the switching prohibition setup time ta0 (prohibition release timing) (S25:Yes). On the other hand, in this modification 1, in places of the configuration in which the mode switching prohibition period is set based on the elapsed time, the prohibition flag Fa is set to "0" and switching to the inquiry mode is permitted at timing when the running distance of the vehicle after the ASL operation unit 50 operates in the normal mode.

Figure 8:
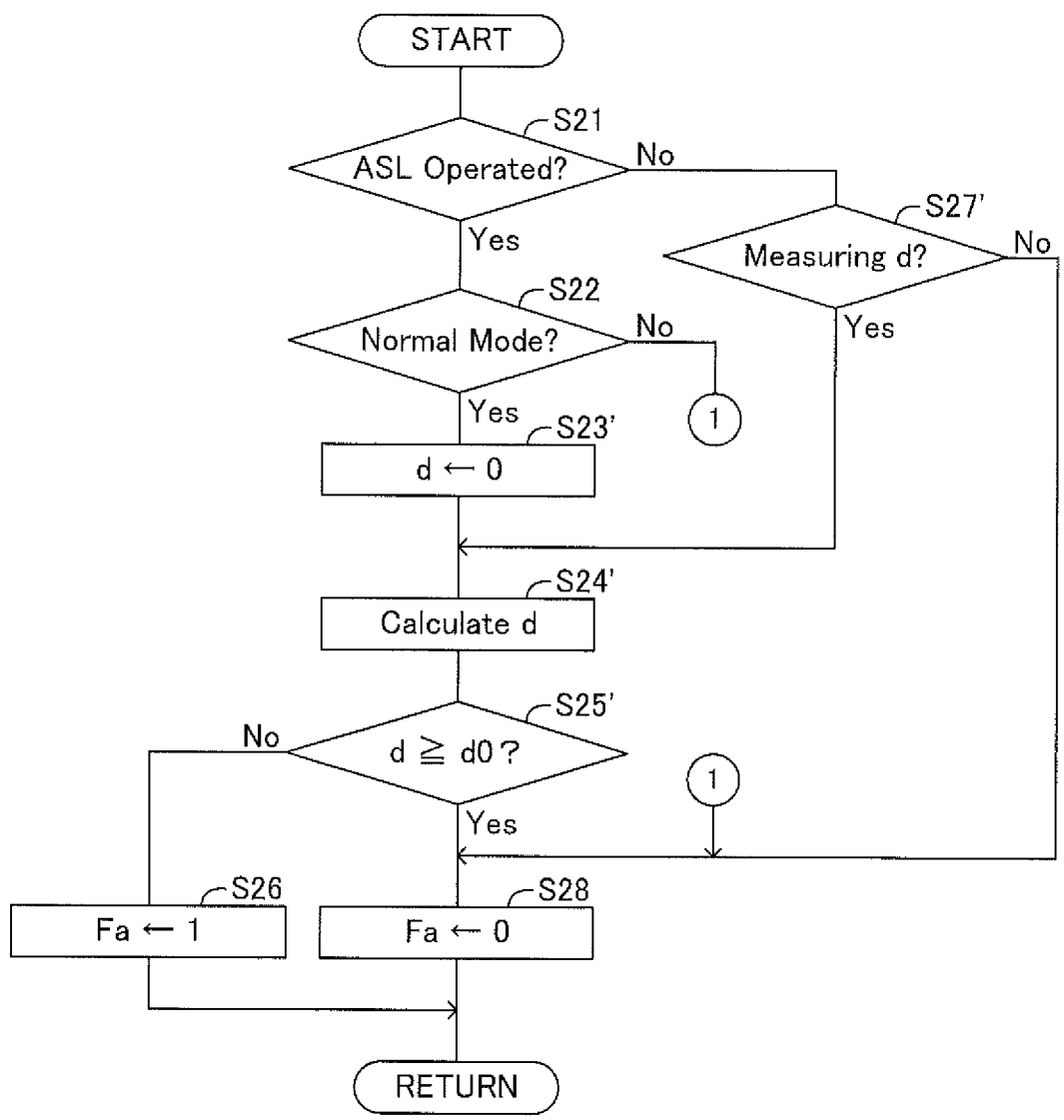
FIG. 8 is a flowchart for showing a prohibition flag setting routine according to a modification.

In this modification 1, for example, the upper-limit vehicle speed setting ECU 20 carries out the prohibition flag setting routine shown in FIG. 8, in place of the prohibition flag setting routine (FIG. 6) according to the above-mentioned embodiment. In a prohibition flag setting routine according to this modification, steps S23', S24', S25' and S27' are prepared in places of the steps S23, S24, S25 and S27 of the prohibition flag setting routine according to the above-mentioned embodiment, and processing in the rest is the same as the prohibition flag setting routine according to the above-mentioned embodiment. Therefore, the modified steps S23', S24', S25' and S27' will be explained here. Regarding the processing in common with the above-mentioned embodiment, reference signs in common with the above-mentioned embodiment are given to the corresponding steps in a drawing, and an explanation thereof is omitted.

The upper-limit vehicle speed setting ECU 20 resets a measured value d of running distance (referred to as a running distance d) in step S23', and calculates the running distance d in subsequent step S24' based on actual vehicle speed detected by the speed sensor 31. In this case, although the running distance d is zero when step S24' is carried out for the first time, the running distance d is calculated based on an integrated value of the actual vehicle speed in the processing for the second time or later.

The upper-limit vehicle speed setting ECU 20 judges whether the running distance d has reached a predetermined setting distance d0 in step S25'. The setting distance d0 is a certain distance (>0) for setting up the mode switching prohibition period during which switching from the normal mode to the inquiry mode is forbidden.

When the running distance d has not yet reached the setting distance d0, the upper-limit vehicle speed setting ECU 20 sets the prohibition flag Fe to "1" in step S26, and once ends the prohibition flag setting routine. The upper-limit vehicle speed setting ECU 20 repeats the prohibition flag setting routine in a predetermined short operation period. Therefore, since the first operation of the ASL operation unit 50 has been completed when the prohibition flag setting routine is resumed, it is judged as "No" in step S21, and the upper-limit vehicle speed setting ECU 20 advances the processing to step S27'.

The upper-limit vehicle speed setting ECU 20 judges whether the running distance d is under measurement in step S27', and advances the processing to step S24' and carries out the above-mentioned processing when it is under measurement. When such processing is repeated and the running distance d reaches the setting distance d0 (S25': Yes), the upper-limit vehicle speed setting ECU 20 sets the prohibition flag Fa to "0" in step S28, and once ends the prohibition flag setting routine. Therefore, when an operation of the ASL operation unit 50 is detected in the normal mode, the prohibition flag Fa is set as "1" until the running distance d after the operation is detected reaches the setting distance d0. In addition, the upper-limit vehicle speed setting ECU 20 ends the measurement of the running distance d in step S28.

The same effect as the above-mentioned embodiment can be acquired also by this modification 1. Moreover, the running distance for which the vehicle runs until the control mode is switched to the inquiry mode (second function) after a speed limit is changed can be restricted, since the mode switching prohibition period is set based on the running distance d.

<Modification 2 for Setting Mode Switching Prohibition Period>

Moreover, in another modification (modification 2) for setting the mode switching prohibition period, the mode switching prohibition period can also be set based on a combination of the switching prohibition setup time ta0 in the above-mentioned embodiment and the setting distance d0 in the above-mentioned modification 1. For example, the upper-limit vehicle speed setting ECU 20 may be configured to acquire a timing (referred to as a timing 1) when the timer value to reaches the switching prohibition setup time ta0 like the above-mentioned embodiment and a timing (referred to as a timing 2) when the running distance d reaches the setting distance d0 like the above-mentioned modification 1, and to cancel the mode switching prohibition period at a timing of the earlier one of the two timings 1 and 2. In accordance with this, a timing when the control mode is switched from the normal mode to the inquiry mode can be made further proper without delay.

<Modification for Reply Operation of ASL Operation Unit>

Although the upper-limit vehicle speed setting ECU 20 recognizes one of the lever operations in upward and downward directions of the ASL operation unit 50 as the permission operation and recognizes the other of the lever operations as the rejection operation in the above-mentioned embodiment, it may be configured so that only one of the lever operations in upward and downward directions (for example, only a lever operation in the downward direction) is recognized as the permission operation (namely, the other lever operation is not recognized as the rejection operation). In this case, the rejection operation is unnecessary, since it is considered that the rejection reply is made when the inquiry time limit tb0 has passed. Therefore, operation burden of a driver can be reduced, and it is user-friendly.

Moreover, conversely, it may be configured so that only one of the lever operations in upward and downward directions is recognized as the rejection operation (namely, the other lever operation is not recognized as the permission operation). In this case, the upper-limit vehicle speed setting ECU 20 just has to consider that the permission operation is made when the inquiry time limit tb0 has passed. Therefore, operation burden of a driver can be reduced, and it is user-friendly.

Moreover, it may be configured so that acceptance of a speed limit is permitted by a lever operation in an upward direction of the ASL operation unit 50 when the speed limit changes in an increasing direction (for example, when it changes from 80 km/h to 100 km/h) and acceptance of a speed limit is permitted by a lever operation in a downward direction of the ASL operation unit 50 when the speed limit changes in a decreasing direction (for example, when it changes from 100 km/h to 80 km/h). Namely, it may be configured so that the operation function of the ASL operation unit 50 is switched according to the direction of change of a speed limit.

<Modification of ASL Operation Unit>

Figure 9:
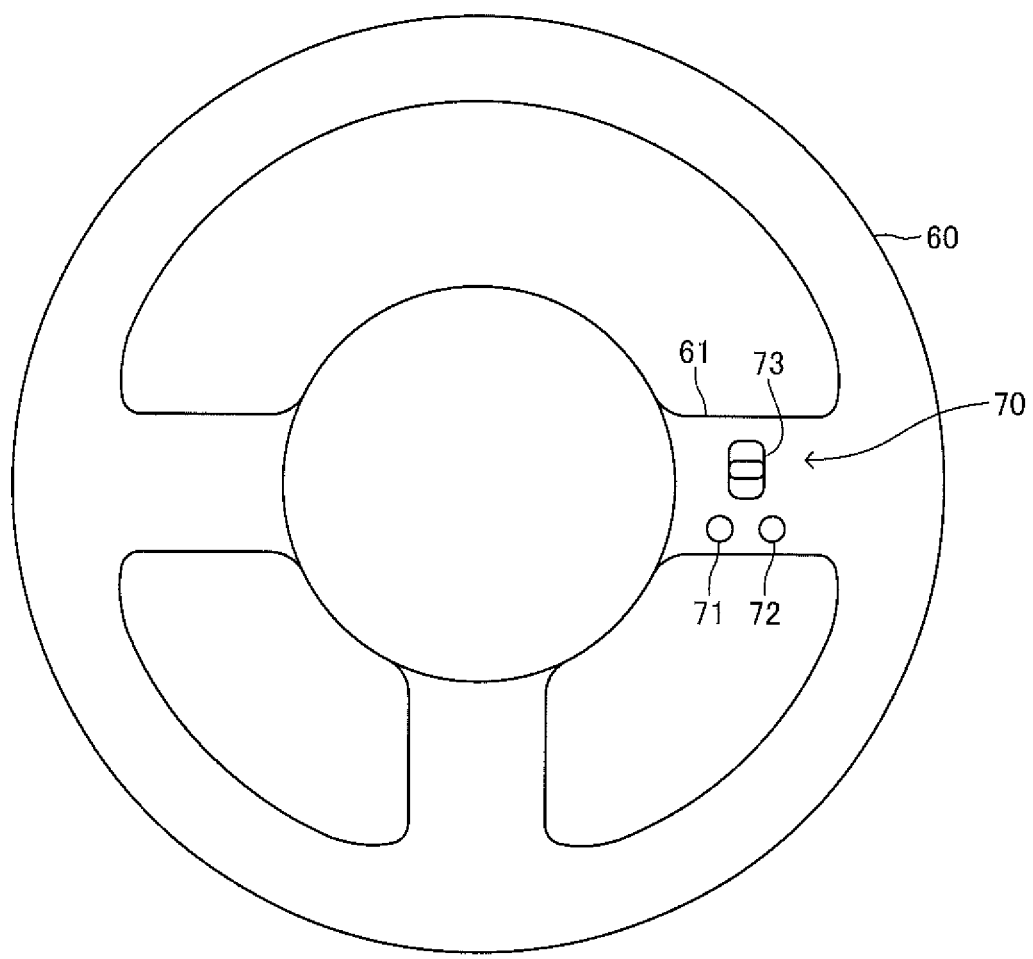
FIG. 9 is a front view of an ASL operation unit according to a modification.

Although the ASL operation unit 50 is an operation machine of a lever operation type in the above-mentioned working example, its operation type is not limited to a lever operation type, and may be a button operation type, for example. For example, as shown in FIG. 9, it may have a configuration in which an ASL operation unit 70 is prepared in a non-grip portion 61 of a steering handle 60. In this example, the ASL operation unit 70 comprises a main button 71, a cancel button 72 and a selector button 73, and is configured so that the same operations as the resume/speeding-up switch 53 and the setting/slowing-down switch 54 in the above-mentioned embodiment are attained by selectively pushing or sliding the selector button 73 in a upward and downward directions (directions of clockwise rotation and counterclockwise rotation of the steering handle 60).

<Modification for Using Both ASL Operation Unit and Another Operation Unit>

For example, in a vehicle equipped with a cruise control device which keeps running vehicle speed of a self-vehicle constant, the ASL operation unit 50 according to the present embodiment can double as a setting operation unit for setting target vehicle speed. In this case, a selecting switch for alternatively choosing whether to activate the cruise control device or the vehicle speed limiting device may be disposed in a location which is easy for a driver to operate, such as a non-grip portion of a steering handle, for example. Thereby, the driver can choose which function is used. Target speed in cruise control can be increasingly and decreasingly adjusted by operations in upward and downward directions, like the operations of the ASL operation unit 50 in the above-mentioned embodiment.

As mentioned above, although the according-to vehicle speed limiting device was explained to the present embodiment and the change, unless it is not limited to the above-mentioned embodiment and a change and deviates from the objective of the present invention, various changes are possible for the present invention.

Although a display unit is used to inform a driver that a speed limit is changed in the present embodiment, it may be configured so that a sound device (for example, a phonetic announce device and a buzzer, etc.), which is not shown, is used to reports to a driver that a speed limit is changed, in place of or in addition to a display unit.

Moreover, although it is configured so that adjustment of the upper-limit vehicle speed and a reply operation are performed by operations in upward and downward directions of the ASL operation unit 50 in the present embodiment, the operation directions of the ASL operation unit are not limited in the upward and downward directions, and they may be other directions, such as horizontal directions (right and left directions) or longitudinal directions (front-back directions).

REFERENCE SIGNS LIST

10: a speed limit acquisition ECU, 11: an in-vehicle camera, 12: a navigation device, 20: an upper-limit vehicle speed setting ECU, 30: an engine ECU, 31: a speed sensor, 32: an accelerator sensor, 35: an engine, 40: a meter ECU, 41: a display unit, 50 and 70: an ASL operation unit, 51: a control lever, 52: a main switch, 53: a resume/speeding-up switch, 54: a setting/slowing-down switch, 55: a cancellation switch, 60: a steering handle, D1: a normal display screen, D2: an inquiry display screen, Fa: a prohibition flag, Fb: an inquiry mode flag, ta0: a switching prohibition setup time, tb0: an inquiry time limit.

The invention claimed is:

1. A vehicle speed limiting device which acquires a speed limit of a vehicle in a run way, sets up upper-limit vehicle speed that is an upper limit of vehicle speed based on said acquired speed limit, and controls driving force so that said vehicle speed does not exceed said upper-limit vehicle speed, comprising:
an upper-limit vehicle speed change operation unit comprising at least one of a lever or a plurality of buttons, the upper-limit vehicle speed change operation unit configured to:
perform, in response to a driver's first operation to the upper-limit vehicle speed change operation unit during a first mode, a first function that changes said upper-limit vehicle speed to a first desired value,
perform, in response to a driver's second operation to the upper-limit vehicle speed change operation unit during the first mode, a second function that changes said upper-limit vehicle speed to a second desired value,
perform, in response to the driver's first operation to the upper-limit vehicle speed change operation unit during a second mode, a third function that accepts a change of said speed limit, and
perform, in response to the driver's second operation to the upper-limit vehicle speed change operation unit during the second mode, a fourth function that rejects the change of said speed limit,
a controller that is configured to:
temporarily switch functions of said upper-limit vehicle speed change operation unit from the first and second functions to the third and fourth functions when switching from the first mode to the second mode at a timing when said acquired speed limit is switched to a new speed limit, and
prohibits switching of the function of said upper-limit vehicle speed change operation unit from said first and second functions to said third and fourth functions, even if said acquired speed limit is switched to the new speed limit, until a predetermined prohibition release timing comes after said upper-limit vehicle speed change operation unit operates with said first or second functions.

2. The vehicle speed limiting device according to claim 1, wherein:
said predetermined prohibition release timing comes when elapsed time after said upper-limit vehicle speed change operation unit operates with said first and second functions reaches predetermined setup time.

3. The vehicle speed limiting device according to claim 2, further comprising:
a display which displays a first display screen showing an upper-limit vehicle speed at present during a period when said upper-limit vehicle speed change operation unit operates with the first and second functions, and displays a second display screen showing said new speed limit and a reply operation method about whether a change of said speed limit is accepted, in addition to said upper-limit vehicle speed, during a period when said upper-limit vehicle speed change operation unit operates with the third and fourth functions.

4. The vehicle speed limiting device according to claim 1, wherein:
said predetermined prohibition release timing comes when running distance of the vehicle after said upper-limit vehicle speed change operation unit operates with said first and second functions reaches predetermined setup distance.

5. The vehicle speed limiting device according to claim 4, further comprising:
a display which displays a first display screen showing an upper-limit vehicle speed at present during a period when said upper-limit vehicle speed change operation unit operates with the first and second functions, and displays a second display screen showing said new speed limit and a reply operation method about whether a change of said speed limit is accepted, in addition to said upper-limit vehicle speed, during a period when said upper-limit vehicle speed change operation unit operates with the third and fourth functions.

6. The vehicle speed limiting device according to claim 1, wherein:
said predetermined prohibition release timing comes when elapsed time after said upper-limit vehicle speed change operation unit operates with said first and second functions reaches predetermined setup time or when running distance of the vehicle after said upper-limit vehicle speed change operation unit operates with said first and second functions reaches predetermined setup distance, whichever comes first.

7. The vehicle speed limiting device according to claim 6, further comprising:
a display which displays a first display screen showing an upper-limit vehicle speed at present during a period when said upper-limit vehicle speed change operation unit operates with the first and second functions, and displays a second display screen showing said new speed limit and a reply operation method about whether a change of said speed limit is accepted, in addition to said upper-limit vehicle speed, during a period when said upper-limit vehicle speed change operation unit operates with the third and fourth functions.

8. The vehicle speed limiting device according to claim 1, further comprising:
a display which displays a first display screen showing an upper-limit vehicle speed at present during a period when said upper-limit vehicle speed change operation unit operates with the first and second functions, and displays a second display screen showing said new speed limit and a reply operation method about whether a change of said speed limit is accepted, in addition to said upper-limit vehicle speed, during a period when said upper-limit vehicle speed change operation unit operates with the third and fourth functions.

9. The vehicle speed limiting device according to claim 8, wherein:
said display displays only an operation method for accepting or rejecting a change of said speed limit as the reply operation method displayed in said second display screen, and
the controller is further configured to judge that a driver rejects to accept a change of said speed limit when said upper-limit vehicle speed change operation unit is not operated during a period when said upper-limit vehicle speed change operation unit operates with said third and fourth functions.

10. The vehicle speed limiting device according to claim 1, wherein the controller is further configured to revert the functions of said upper-limit vehicle speed change operation unit from said third and fourth functions to said first and second functions, at a timing when said upper-limit vehicle speed change operation unit operates with said third and fourth functions.

11. The vehicle speed limiting device according to claim 1, wherein
the upper-limit vehicle speed change operation unit is the lever, and the driver's operation of the upper-limit vehicle speed change operation unit is an actuation of the lever in a first direction for the first function and the actuation of the lever in a second direction for the second function,
wherein the actuation of the lever in the first direction changes the upper-limit vehicle speed as the first function in the first mode, but as the third function in the second mode, accepts the change to the new speed limit, and
wherein the actuation of the lever in the second direction changes the upper-limit vehicle speed, in a manner opposite the first function, as the second function, but as the fourth function in the second mode, rejects the change to the new speed limit.

12. The vehicle speed limiting device according to claim 1, wherein
the upper-limit vehicle speed change operation unit is the plurality of buttons, the plurality of buttons including a first button and a second button in a portion of a steering wheel, and the driver's operation of the upper-limit vehicle speed change operation unit is an actuation of the first button or the second button,
wherein the actuation of the first button changes the upper-limit vehicle speed as the first function in the first mode, but, as the third function in the second mode, accepts the change to the new speed limit, and
wherein the actuation of the second button changes the upper-limit vehicle speed, in a manner opposite the first function, as the second function in the first mode, but, as the fourth function in the second mode, rejects the change to the new speed limit.

* * * * *